US005798825A

United States Patent [19]

Blanding et al.

[11] Patent Number: 5,798,825

[45] Date of Patent: Aug. 25, 1998

[54] AIR BEARING IMAGING PLATEN

[75] Inventors: Douglass L. Blanding, Rochester; John J. Meyers, Penfield, both of N.Y.

[73] Assignee: Eastman Kodak Company, Rochester, N.Y.

[21] Appl. No.: 792,561

[22] Filed: Jan. 31, 1997

[51] Int. Cl.$^{6}$ .............................. G03B 27/60; B41J 2/47

[52] U.S. Cl. .............................. 355/73; 347/262; 347/264

[58] Field of Search .............................. 355/73, 76, 91; 271/195; 226/7, 97.1; 406/86, 88; 347/262, 264; 346/134; 352/222

[56] References Cited

U.S. PATENT DOCUMENTS

| | | | |
|---|---|---|---|
| 3,617,127 | 11/1971 | McDuff | 355/73 |
| 3,741,650 | 6/1973 | Leavitt et al. | 355/91 |
| 4,052,732 | 10/1977 | Meadows | 354/297 |
| 4,168,506 | 9/1979 | Corsover | 347/262 |
| 4,184,764 | 1/1980 | Bailey et al. | 355/54 |
| 4,408,864 | 10/1983 | Hardenbrook | 355/3 TE |
| 4,505,578 | 3/1985 | Balasubramanian | 355/43 |
| 4,608,578 | 8/1986 | Balasubramanian et al. | 346/160 |
| 4,686,541 | 8/1987 | Rosier | 347/262 |
| 5,508,730 | 4/1996 | Klein | 347/264 |
| 5,576,754 | 11/1996 | Korem | 347/262 |
| 5,671,005 | 9/1997 | McNay et al. | 347/262 |

FOREIGN PATENT DOCUMENTS

| | | | |
|---|---|---|---|
| 0 632 434 A1 | 1/1995 | European Pat. Off. | G11B 7/00 |

OTHER PUBLICATIONS

D. G. Herzog, S. L. Corsover, B. L. Compton, High performance image generators for reconnaissance applications, 1981, SPIE vol. 309 Airborne Reconnaissance V, pp. 45–61.

Paul B. Pierson, Design considerations for a flexible high–resolution film recording system, 1979, SPIE vol. 200 Laser Recording and Information Handling, pp. 100–113.

John H. Keightley, Application of internal drum film recorder architecture, 1987, SPIE vol. 759 Hard Copy Output Technologies, pp. 109–115.

Keith A. Butters and Stephen R. Poludniak, A high resolution (5.7 micron) laser film printer, 1984, SPIE vol. 498 Laser Scanning and Recording, pp. 19–26.

*Primary Examiner*—A. A. Mathews

*Attorney, Agent, or Firm*—Nelson Adrian Blish

[57] ABSTRACT

An air-bearing imaging platen (20) for supporting imaging medium (40). The imaging platen (20) is comprised of an array of disks (62). Each disk has an air exit hole (64) in an approximate center of the disk (62) and a pneumatic system provides air to each disk. Air exits the hole (64) and flows in a radial direction across a surface (69) of the disk (64) creating a negative pressure in the area between the hole (64) and an edge (68) of the disk (62). The negative pressure holds the imaging medium (40) close to the hole (64), and the air flow provides a cushion which supports the imaging medium (40), thus insuring frictionless support while holding the image medium (40) in a curved shape. The air flow exits at the edge (68) of each disk. In various embodiments the contour of the surface (69) of the disk (62) may have various cross sectional shapes such as flat, conical, or spherical.

14 Claims, 6 Drawing Sheets

AIR BEARING IMAGING PLATEN

BACKGROUND OF THE INVENTION

1. Field of the Invention

This invention relates in general to laser writing system and in particular to a cylindrically shaped, air-bearing imaging platen which provides relative motion between an optical system and an imaging medium.

2. Detailed Description of Related Prior Art

Laser writing systems are used to write data to an imaging medium. In a typical system, shown in FIG. 1, a laser beam 12 rapidly scans the imaging medium, mounted on drum 17. The imaging medium absorbs the laser light, producing an image on the medium. In this type of apparatus, a laser beam scans the medium by means of scanning optics 14, such as a rotating polygon having reflective surfaces. Scanning is along a line 16 extending across the width of the medium. To obtain coverage of the entire medium, the medium is advanced relative to the laser beam in a synchronized manner. The imaging medium, usually photographic film or paper, is advanced by mounting the film on the drum 17 and rotating the drum smoothly as the scan lines are written. A servomotor or other type of drive system rotates the drum until the entire sheet of medium has been scanned.

In the drum type of imaging apparatus the scan optics have been designed to image onto a straight scan line on the medium on the surface of the drum. As the scan is moved from one edge of the drum to the other, the scanning optics must compensate for the fact that a pixel 18 at the center of the scan line 16 is closer to the scanning optics 14 than when the scanning optics is producing a pixel 19 at an edge of the drum 17. The distance must be compensated for in order to ensure that pixel 18 and pixel 19 are approximately the same size. This necessitates a complicated design for the optical system.

Some laser writing systems use scan optics which have been designed to image onto a non-straight scan line to simplify the scanning optics so that the focal point of the scanned laser beam at the surface of the imaging medium is at an equal distance from the scanning optics for all points along the scan line. For example, if the scan line is in a concave circular shape, then the platen must constrain the medium in a circular trough shape. In this configuration, the medium must be "towed" across a platen whose shape is contoured to hold the medium in a curved shape to precisely match the shape of the scan line.

Platen systems designed to hold imaging medium are described in prior art U.S. Pat. Nos. 4,608,578 and 4,505,578 These prior art patents, however, disclose systems in which there is physical contact between the platen and the medium. This physical contact results in frictional forces being applied to the medium as it is dragged across the platen by the medium drive system. It is the nature of frictional forces to be variable and the variation in the friction force will interact with the medium drive system and produce subtle variation in medium speed, resulting in image quality degradation.

Prior art attempts to solve this problem have not been entirely successful. One technique for solving this problem is disclosed by U.S. Pat. Nos. 4,608,578 and 4,505,578 which show the use of a hydraulic cylinder to control the movement of a carriage on which a photosensitive medium or scanning mechanism is placed. In each of these patents, a braked, gravity transport is provided for moving a carriage. The carriage is propelled by a falling mass which works against a piston that is supported in a cylinder containing hydraulic fluid. A valve limits the flow of hydraulic fluid out of the cylinder so that the fall of the mass, and hence the carriage, is braked to a uniform velocity. The velocity of the carriage is controlled by controlling the rate of fluid flow through the valve. A problem with this device is that it is difficult to obtain a uniform velocity throughout the full extent of carriage movement. The carriage velocity, and therefore its precise position at any specified time, depends upon a delicate balance between the force of gravity, the hydraulic braking force, and the force of friction between the moving parts, such as the carriage on its rails, the hydraulic seals on the cylinder bore, etc. Since friction is notoriously variable, the carriage velocity can be expected to be variable. Further problems with this type apparatus are that the apparatus is large, complex, and the falling mass must necessarily be oriented vertically.

SUMMARY OF THE INVENTION

It is an object of the invention to provide an imaging platen for transporting an imaging medium which reduces the effects of vibration caused by moving the imaging medium.

It is also an object of the invention to provide a method and apparatus for reading and writing on an imaging medium held on a cylindrically curved platen.

The above and other objects are accomplished by a method and apparatus for supporting an imaging medium on a cushion of air provided by an array of disks whose faces collectively comprise the surface of a platen. Radial movement of the air from the center of the disks produces a negative static pressure in the space between the disk and the medium, which holds the imaging medium close to the surface of the disk. Over the full surface of the disk, the air tends to cushion and support the imaging medium above the surface of the disk. In one embodiment, relative motion between a scanning beam and the imaging medium carried on the air bearing imaging platen, is provided by a paper metering roller. An air-bearing imaging platen according to the present invention, provides a surface which is virtually frictionless. Thus, when the imaging medium is moved over the air-bearing platen, the movement is essentially free from vibration.

DETAILED DESCRIPTION OF THE PREFERRED EMBODIMENTS

Figure 2:
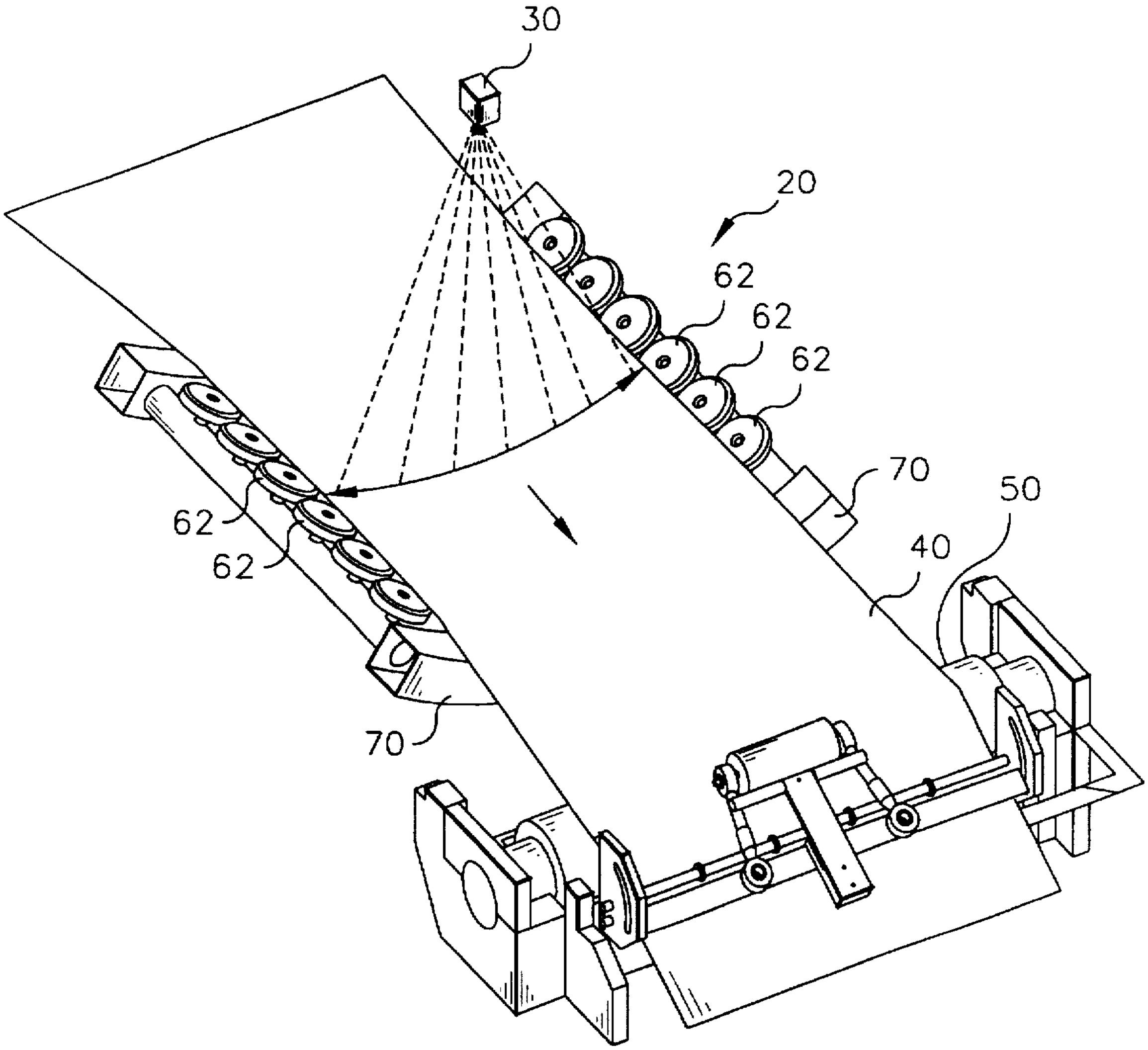
FIG. 2 shows a perspective view of an air bearing imaging platform according to the present invention.

FIG. 2 shows a curved air bearing imaging platen 20 according to the present invention. Other components which would be used in a laser writing apparatus include a laser light source 30, imaging medium 40, and paper metering roller 50, which pulls the imaging medium across the platen 20 at a steady speed.

Figure 3:
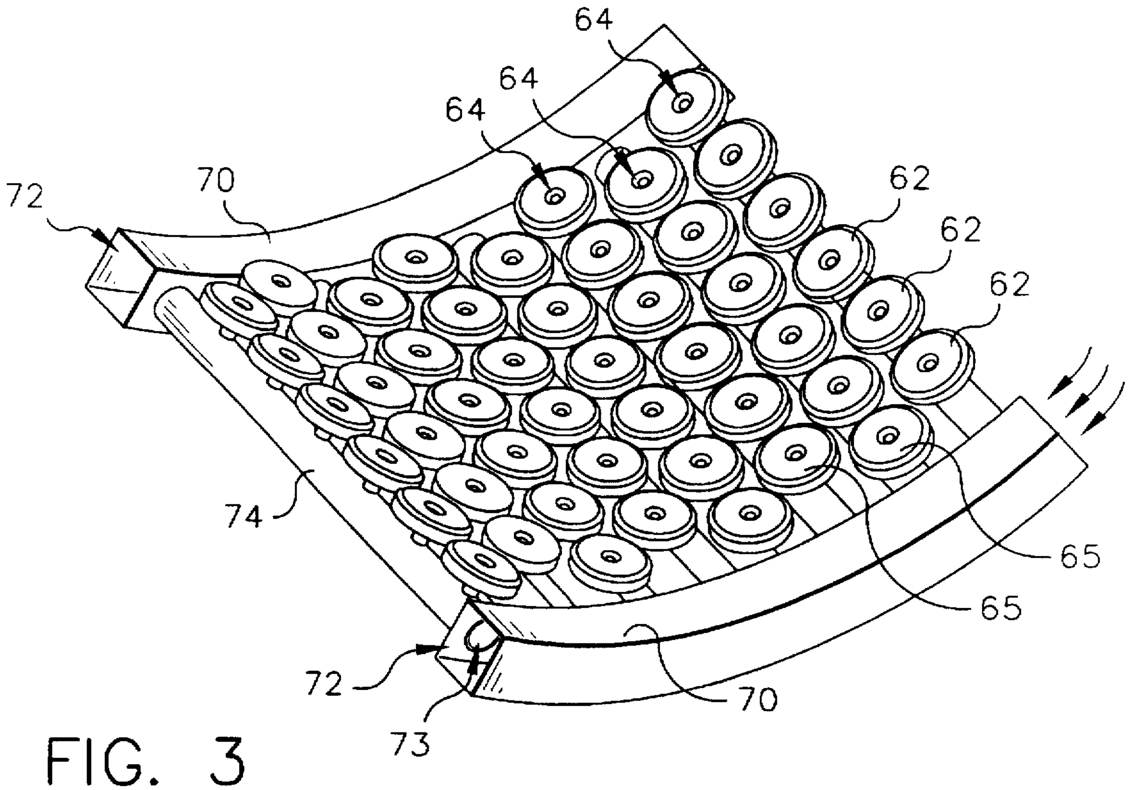
FIG. 3 shows a perspective view of a surface of an air bearing imaging platen with disk array.

The imaging platen, shown in more detail in FIG. 3, consists of an array of circular disks 62 arranged in a pattern. The collective faces 65 of disks 62 define a cylindrical surface. Each disk has a hole 64 in the approximate center of the disk 62, connected to a central opening 73 in pipes 74. Air is supplied through plenum 70 to pipes 74 through holes 64 to each disk.

Figure 4:
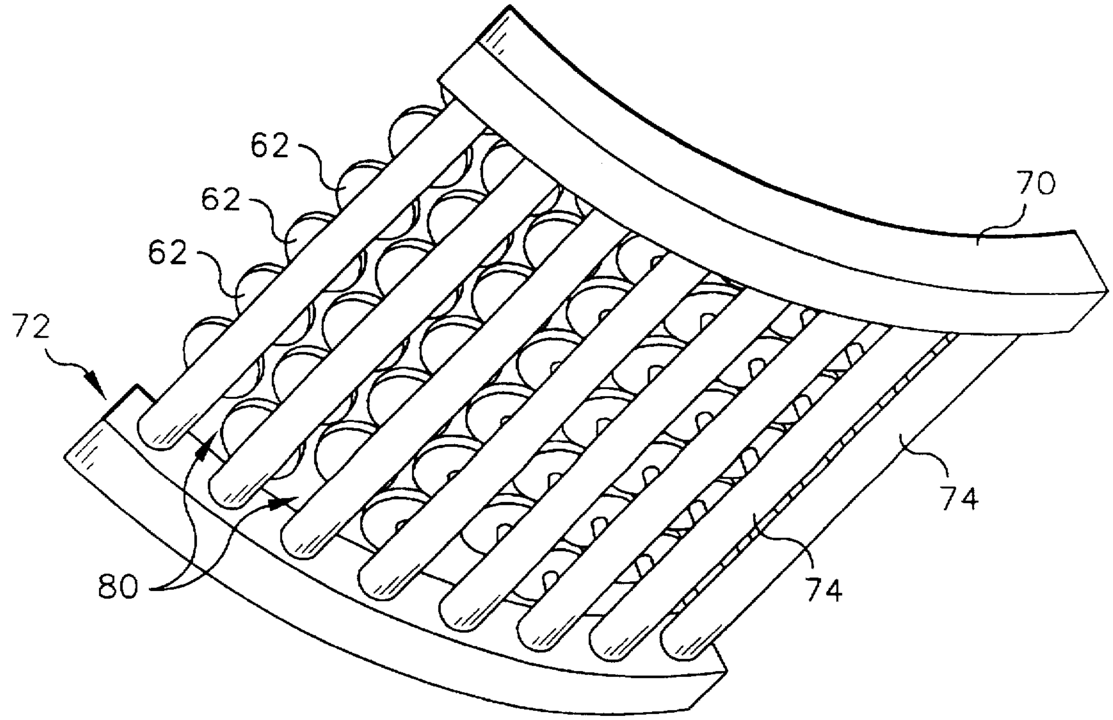
FIG. 4 shows a perspective view from the bottom of an air bearing imaging platen according to the present invention.

FIG. 4 is an underside view of the platen 20, showing the arrangement of pipes 74 and plenums 70 used to supply air to each of the disks. Air is forced into the plenums 70 through openings 72 by a blower or compressor (not shown).

Figure 1:
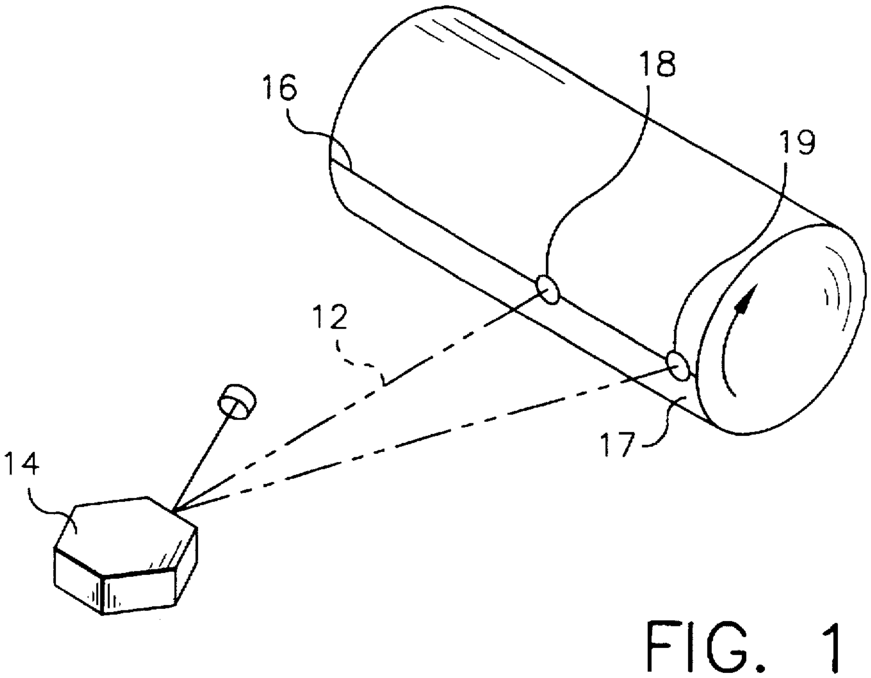
FIG. 1 (PRIOR ART)
FIG. 1 shows a perspective view of a prior art laser writing system using a rotating polygon.
Figure 5:
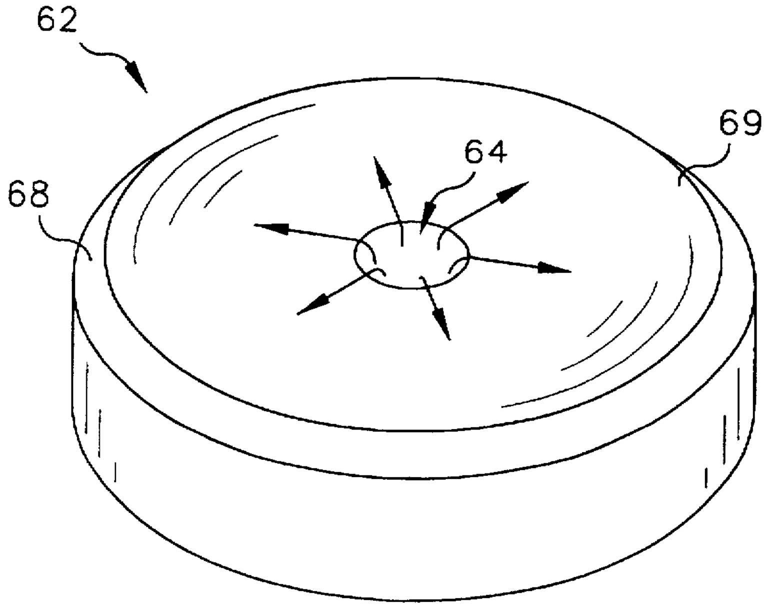
FIG. 5 shows a perspective view of a disk as used in an air bearing imaging platen according to the present invention.
Figure 6:
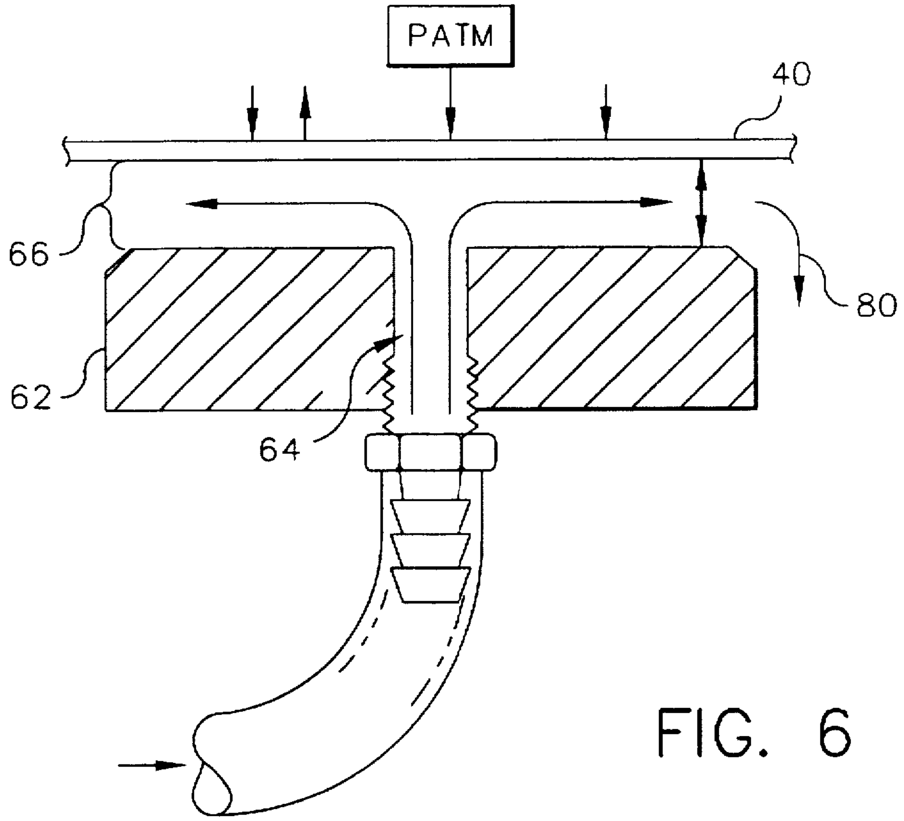
FIG. 6 shows a side view partially in cross-section of the disk shown in FIG. 5.

Referring now to FIGS. 5 and 6, air exits the center hole 64 of each disk 62 into the small space 66 between the surface 69 of the disk and the imaging medium 40. The air then flows in a radial direction, relative to the center of each disk, in the space 66 between the imaging medium 40 and disk surface 69 until it gets to the edge 68 of the disk 62. The air then exits the platen 20 as it flows out through the open spaces 80 between the disks. The air flow from each hole 64 in each of the disks 62 is approximately the same.

The expanding, radial flow pattern on the face of each disk results in a reduction of pressure within the space 66 between the disk 62 and the medium 40, beyond the hole 64. This reduced pressure is due to the Bernoulli principal because the air has a high velocity entering this space. As the air flows outward to the edge 68 of the disk 62, the velocity of the air decreases. On the basis of energy conservation the reduction in velocity pressure, less dynamic losses, produces a negative static pressure in the space between the disk and the medium. This negative static pressure is greatest at the entrance to the space between the disk and the medium and reduces to zero at the outer edge 68 of the disk 62. Thus, at the edge of the disk where the air velocity is also quite low the total pressure is only slightly more than atmospheric.

The negative static pressure created in the space between the disk surface and the imaging medium is, in the aggregate, less than the pressure on the opposite side of the medium, which is equal to atmospheric pressure. This pressure differential causes the imaging medium to be pulled toward the surface of the disk. Over the full surface of the disk the air tends to cushion and support the imaging medium above the face of the disk.

When the air space between the imaging medium and disk surface decreases, in order to sustain the air flow, the static pressure in the air space must increase. This effect balances the negative pressure effect described above. In one embodiment of the invention the two effects achieve a balance and cause the air space between the medium and disk surface to be maintained at a value of approximately 0.010 to 0.015 inches, however, the exact distance the imaging medium is held above the face of the disk depends on the diameter of this disk, the diameter of the hole in the center of the disk, the flow rate of the air, surface contour, and other factors.

The imaging medium 40 is relatively inflexible over the area defined by the surface of the disk. Thus, the differential pressure, which varies with radial position from the center of the disk to the edge of the disk, will not cause appreciable bending of the medium. In one embodiment of the present invention the diameter of the disk is approximately 1¾ inches and the diameter of the hole is approximately 3/16 inch. Disks which are appreciably larger may experience undesirable bending of the imaging medium. However, this depends on the thickness of the imaging medium and distance between disks.

Figure 9:
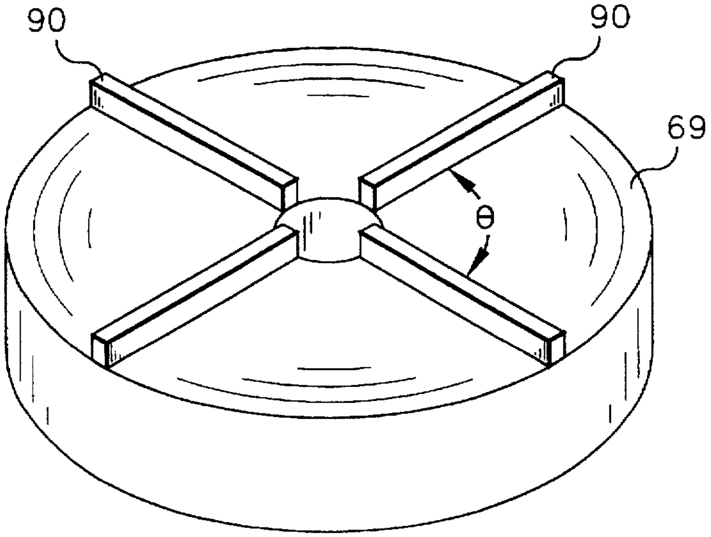
FIG. 9 shows a perspective view of a disk having radial vanes spaced circumferentially on the disk surface.
Figure 7:
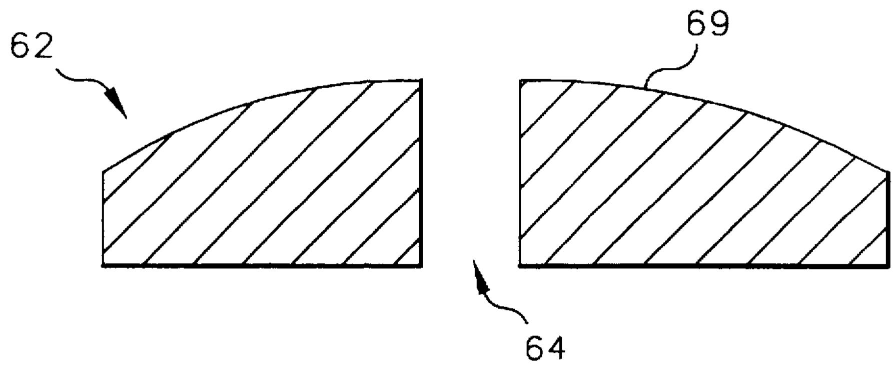
FIG. 7 shows a cross section of a disk with a spherical surface.
Figure 8:
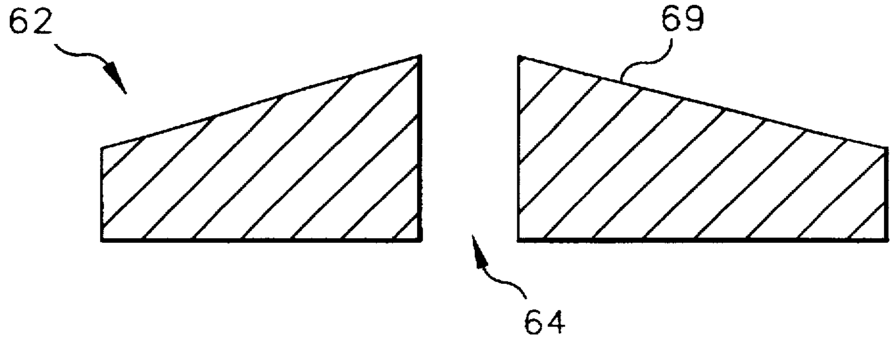
FIG. 8 shows a cross section of a disk with a conical surface.

In other embodiments, the surface 69 of the disk 62 is contoured. In the embodiment shown in FIG. 7 surface 69 is spherical and in the embodiment shown in FIG. 8 surface 69 is conical. In yet another embodiment, the surface 69 is provided with low, thin, radial vanes 90 which extend above the surface 69 and are spaced circumferentially at an angle (θ) as shown in FIG. 9. The embodiments shown in FIGS. 7–11 all improve the air flow dynamics, suppress sheet "flutter", and reduce audible noise levels.

Figure 10:
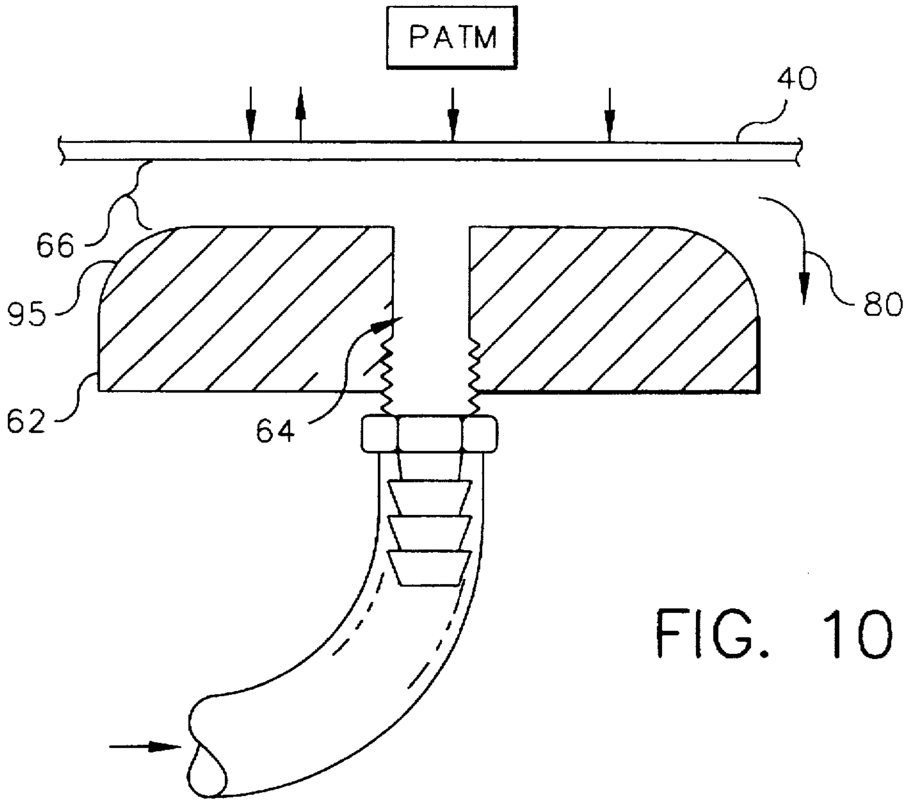
FIG. 10 shows a cross section of a disk with a rounded edge.
Figure 11:
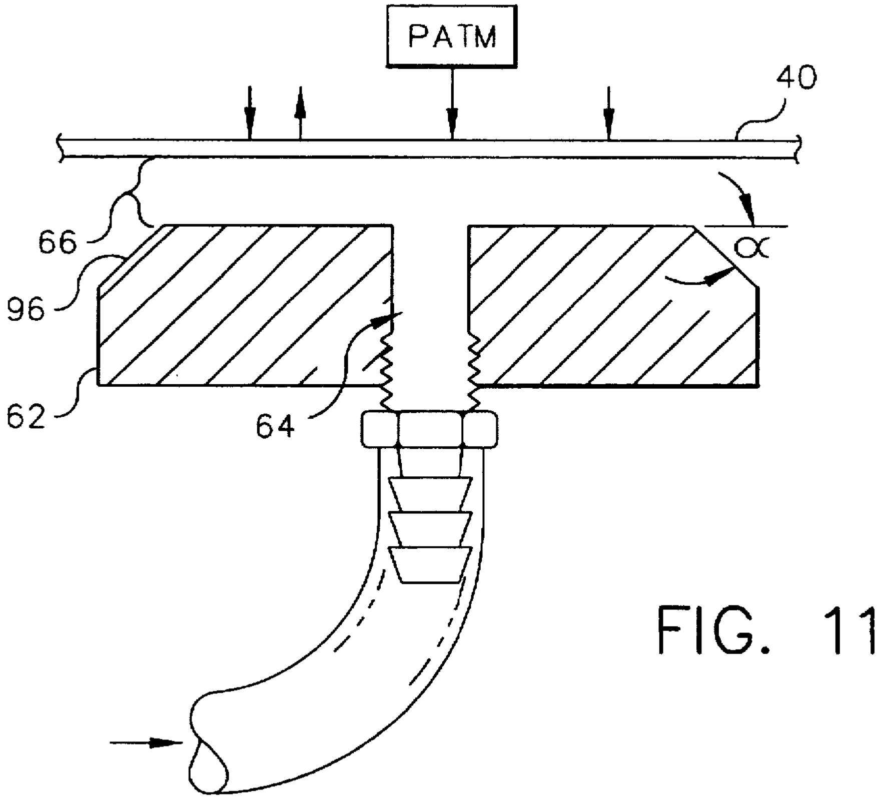
FIG. 11 shows a cross section of a disk with a conical edge.

An additional improvement in flow dynamics is provided by exhausting the air flow at the edge of the disk through expansion section 95 as shown in FIG. 10. The edge 68 of disk 62 is rounded off as shown in FIG. 10. In another embodiment, shown in FIG. 11, edge 68 is a flat conical surface. The flat conical surface should be at an angle of between 10° and 30°.

Air is the fluid medium which supports the image medium in the description above, however, other suitable fluids, for example other gases or liquids, are intended to fall within the scope of the claims of this invention. Also, while the disk has been described as being circular, other geometric shapes with holes at the center, or a number of holes in the face of the geometric shape, may be expected to function in a manner similar to that described and, fall within the scope of the claims of the present invention. While the invention has been described with the hole located in the approximate center of the disk, off-center holes can be expected to function in a similar manner. The term imaging medium is intended to broadly cover a variety of sheet material including but not limited to paper and film.

The invention has been described in detail with particular reference to preferred embodiment thereof, but it will be understood that variations and modifications can be effected within the spirit and scope of the invention as set forth in the claims.

| Parts List | |
|---|---|
| 20 | Air-bearing imaging platen |
| 30 | Laser light source |
| 40 | Imaging medium |
| 50 | Paper metering roller |
| 62 | Circular disks |
| 64 | Center hole |
| 65 | Collective faces |
| 66 | Space between disk & medium |
| 68 | Edge of disk |
| 69 | Surface of disk |
| 70 | Plenums |
| 72 | Opening |
| 73 | Central opening |
| 74 | Pipes |
| 80 | Open space |
| 90 | Vanes |
| 95 | Rounded Expansion Discharge |
| 96 | Conical Expansion Discharge |

We claim:

1. An air-bearing imaging platen for supporting imaging medium comprising:

an array of disks, wherein each of said disks has at least one air exit hole and said disks collectively comprise a surface of said platen; and a pneumatic system which provides air to each of said disks, wherein said air exits said disk through said hole and flows across a surface of said disk in a radial direction from said hole.

2. An air-bearing imaging platen as in claim 1 wherein said hole is in an approximate center of said disk.

3. An air-bearing imaging platen as in claim 1 further comprising a paper roller which moves said imaging medium across said platen.

4. An air-bearing imaging platen as in claim 1 wherein air exits said hole in each of said disks at an approximately uniform velocity.

5. An air-bearing imaging platen as in claim 1 wherein a cross sectional shape of said platen is approximately cylindrical.

6. An air-bearing imaging platen as in claim 1 wherein said hole is approximately circular in shape.

7. An air-bearing imaging platen as in claim 1 wherein said imaging medium is maintained at approximately 0.010 to 0.015 inches away from said surface of each of said disks.

8. An air-bearing imaging platen as in claim 1 wherein a surface of each of said disks is flat.

9. An air-bearing imaging platen as in claim 1 wherein a surface of each of said disks is conical.

10. An air-bearing imaging platen as in claim 1 wherein a surface of each of said disks is spherical.

11. An air-bearing imaging platen as in claim 1 further comprising radial vanes uniformly spaced circumferentially on a surface of each of said disks.

12. A method of supporting an imaging medium comprising the steps of:

supplying air to an array of disks on a surface of an imaging platen;

wherein said air exits each of said disks through a hole in a center of each of said disks and flows in a radial direction across a surface of each of said disks between said disk surface and said imaging medium; and wherein said air flow creates a negative pressure between said imaging medium and said surface of each of said disks.

13. A method of supporting an imaging medium as in claim 12 further comprising the step of:

moving said imaging medium across said air-bearing imaging platen.

14. A method of supporting an imaging medium as in claim 13 wherein a paper metering roller moves said imaging medium across said imaging platen.

* * * * *